(12) United States Patent
Irie et al.

(10) Patent No.: US 6,606,441 B2
(45) Date of Patent: Aug. 12, 2003

(54) PLASTIC OPTICAL FIBER, OPTICAL FIBER CABLE AND OPTICAL TRANSMISSION DEVICE

(75) Inventors: Kikue Irie, Hiroshima (JP); Toshinori Sumi, Hiroshima (JP); Tomonari Yoshimura, Aichi (JP); Yoshihiro Uozu, Hiroshima (JP); Yahei Koyamada, Ibaraki (JP); Shiori Miyake, Ibaraki (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/891,258

(22) Filed: Jun. 27, 2001

(65) Prior Publication Data

US 2002/0037145 A1 Mar. 28, 2002

(30) Foreign Application Priority Data

Jun. 27, 2000 (JP) ........................ 2000-192767

(51) Int. Cl.[7] .............................. G02B 6/02; G02B 6/22
(52) U.S. Cl. .................... 385/127; 385/143; 385/145
(58) Field of Search ................. 385/127, 123, 385/143, 145

(56) References Cited

U.S. PATENT DOCUMENTS

| | | |
|---|---|---|
| 4,542,957 A | 9/1985 | Ishiwari et al. |
| 5,121,461 A | 6/1992 | Yamamoto et al. |
| 5,206,926 A | 4/1993 | Yamamoto et al. |
| 5,644,670 A * | 7/1997 | Fukuda et al. ............... 385/124 |
| 6,449,416 B1 * | 9/2002 | Lee et al. .................... 385/127 |
| 6,466,721 B1 * | 10/2002 | Tsukitani et al. ........... 385/127 |

FOREIGN PATENT DOCUMENTS

| | | |
|---|---|---|
| EP | 0 844 501 A2 | 5/1998 |
| EP | 1 001 292 A2 | 5/2000 |
| GB | 1 475 478 | 6/1977 |
| JP | 1-265208 | 10/1989 |
| JP | 10-160956 A | 6/1998 |

* cited by examiner

*Primary Examiner*—Tulsidas Patel
*Assistant Examiner*—Hae Moon Hyeon
(74) *Attorney, Agent, or Firm*—Fitch, Even, Tabin & Flannery (57) ABSTRACT

A plastic optical fiber includes having a first core, a second core having a different refractive index from the first core, disposed concentrically on the outside of the first core, and a clad disposed concentrically on the outside of the second core, wherein a ratio X ($r_1/r_2$) of a first core radius $r_1$ to a second core radius $r_2$ and a ratio Y ($n_2/n_1$) of a refractive index difference $n_2$ between the second core and the clad to a refactive index difference $n_1$ between the first core and the clad are in a range that satisfies the expressions $Y \geq -1.134X + 1.0518$ (1), and $X \leq -1.4842Y^2 + 1.1097Y + 0.7097$ (2), and provided that Y<0.4 or X≥0.76 and that coordinate pairs X=0.8 and Y=0.35 as well as X=0.8 and Y=0.45 are excluded. The plastic optical fiber can have a high transmission power and a wide bandwidth. A cable and an optical transimission device can each include this plastic optical fiber.

24 Claims, 5 Drawing Sheets

PLASTIC OPTICAL FIBER, OPTICAL FIBER CABLE AND OPTICAL TRANSMISSION DEVICE

TECHNICAL FIELD

The present invention relates to a plastic optical fiber and a plastic optical fiber cable, characterized by a high transmission power and a wide bandwidth and well suited for optical communication media, as well as to an optical transmission device.

BACKGROUND ART

In the field of short-distance communication such as intra-equipment, inter-equipment communication for cars or audio equipments, step index (SI) type plastic optical fibers (POFs) are currently being used as information transmission media. In recent years, with increase in information content for transmission, there have been growing demands that the SI type POF should have a still wider bandwidth.

To meet this requirement of a wider bandwidth, multi-layered structure in which a plurality of core layers with different refractive indices is concentrically formed has been adopted for the core therein.

In Japanese Patent Application Laid-open No. 160956/1998, it is disclosed that, even if, for the sake of easiness in fabrication, the number of layers in the core is kept mere two and the core is made only double-layered, this structure can provide a POF with a low loss transmission characteristic as well as a wide bandwidth by setting each core diameter and refractive index difference between each core layer and the clad to satisfy specific conditions. These specific conditions are therein described as follows. In a plastic optical fiber having a clad, a first core disposed inside the clad and a second core disposed inside the first core, the ratio (X=D2/D1) of the second core diameter (D2) to the first core diameter (D1) is $0.3 \leq X \leq 0.95$, and the ratio (Y=Δ2/Δ1) of the refractive index difference (Δ2) between the first core and the clad to the refractive index difference (Δ1) between the second core and the clad is $0.4 \leq Y \leq 0.95$, and besides the sum of afore-mentioned two ratios (X+Y) is $X+Y \leq 1.9$. With respect to the refractive index difference (Δ1) between the second core and the clad, it is also described that its lower limit is equal to or greater than 0.01 and its upper limit, equal to or less than 0. 1.

Meanwhile, for optical communication such as a link, it is essential to transmit a light with a high transmission power therethrough to an optical receiver. Yet, the optical fiber disclosed in Japanese Patent Application Laid-open No. 160956/1998 fails to transmit the light with a sufficiently high power, due to inappropriate setting of layer thickness and refractive indices for respective layers therein. Further, the optical fiber is manufactured by a method comprising steps of forming an outer circular layer and thereafter introducing the material of an inner circular layer inside that outer circular layer, and, while rotating these, carrying out polymerization of the material of the inner circular layer so that a layer (a compatibly blended layer) made of a polymer blend is each formed to a thickness almost exceeding 15 μm between two core layers and between a core layer and the clad. When these compatibly blended layers are formed as thickly as described above, the light scattering loss becomes considerably high, causing a problem of large transmission loss. Moreover, since the light scattering loss produced in the compatibly blended layer affects the transmission bandwidth, there are occasions that thinning of the compatibly blended layer in this optical fiber results in lowering of the transmission bandwidth. Further, in an optical transmission device utilizing this optical fiber, if the excitation numerical aperture (NA) of the light source is made larger so as to increase the quantity of incident light coupled into the optical fiber and heighten the transmission power, the transmission bandwidth of the optical fiber becomes narrower, which may lead to a problem that signals cannot be transmitted at high speed.

To examine this point further, the transmission bandwidth and transmission power for a POF manufactured by the same rotational polymerization method as described in Japanese Patent Application Laid-open No. 160956/1998 were compared with those for a POF manufactured by the continuous conjugate spinning method. In both cases of those POFs, the outer diameter and the clad thickness were set to be 750 μm and 10 μm, respectively, and X=0.837 and Y=0.7. The observation of the cross-sections of those POFs under a microscope, however, revealed that, while, in the POF manufactured by the rotational polymerization method, there was formed a compatibly blended layer with a thickness of 21 μm around the interface between layers of the first core and the second core, in the POF manufactured by the continuous conjugate spinning method, there was found no compatibly blended layer. When the transmission bandwidths for these POFs were measured in 50 m transmission under the condition of all mode excitation, the bandwidth for the POF manufactured by the rotational polymerization method was 710 MHz, although the bandwidth for the POF manufactured by the continuous conjugate spinning method was 344 MHz. Further, when a SI type POF with a single-layered core in which, as the core material and the clad material, the inner core layer material and the clad material of the afore-mentioned POF were utilized, respectively, and the outer diameter and the clad thickness thereof were set to be 750 μm and 10 μm, respectively, was used as the reference POF, that is, the transmission power of this reference POF was taken to be 1, the relative transmission power of the afore-mentioned POFs having a first core and a second core was measured, using a light source with an excitation NA of 0.6. Thereat, the transmission power of the POF manufactured by the rotational polymerization method was 0.65. In contrast with this, the transmission power of the POF manufactured by the continuous conjugate spinning method was 0.81.

DISCLOSURE OF THE INVENTION

An object of the present invention is to provide a plastic optical fiber and a plastic optical fiber cable, with a high transmission power and a wide bandwidth. Another object of the present invention is to provide an optical transmission device which can transmit signals at high speed.

The present invention relates to a plastic optical fiber having a first core, a second core with a different refractive index from the first core, disposed concentrically on the outside of the first core, and a clad disposed concentrically on the outside of the second core, wherein:

a ratio X ($r_1/r_2$) of a first core radius $r_1$ to a second core radius $r_2$ and a ratio Y ($n_2/n_1$) of a refractive index difference $n_2$ between the second core and the clad to a refractive index difference $n_1$ between the first core and the clad are in a range where the following Expressions $$Y \geq -1.134X + 1.0518 \quad (1)$$

$$X \leq -1.4842Y^2 + 1.1097Y + 0.7097 \quad (2)$$

are satisfied, and besides $$Y < 0.4 \text{ or } X \geq 0.76$$

is satisfied (only excepting that X=0.8 and Y=0.35 as well as X=0.8 and Y=0.45).

Further, the present invention relates to a plastic optical fiber having a first core, a second core with a different refractive index from the first core, disposed concentrically on the outside of the first core, and a clad disposed concentrically on the outside of the second core, wherein:

a ratio X ($r_1/r_2$) of a first core radius $r_1$ to a second core radius $r_2$ and a ratio Y ($n_2/n_1$) of a refractive index difference $n_2$ between the second core and the clad to a refractive index difference $n_1$, between the first core and the clad are in a range where the following Expressions $$Y \geq -1.134X + 1.0518 \quad (1)$$

$$X \leq -1.4842Y^2 + 1.1097\ Y + 0.7097 \quad (2)$$

$$Y \leq 0.7 \quad (3)$$

$$X \geq 0.5 \quad (4)$$

are satisfied (only excepting that X=0.8 and Y=0.35; X=0.8 and Y=0.45 as well as X=0.6 and Y=13/22).

Further, the present invention relates to a plastic optical fiber having a first core, a second core with a different refractive index from the first core, disposed concentrically on the outside of the first core, and a clad disposed concentrically on the outside of the second core, wherein:

a ratio X ($r_1/r_2$) of a first core radius $r_1$ to a second core radius $r_2$ and a ratio Y ($n_2/n_1$) of a refractive index difference $n_2$ between the second core and the clad to a refractive index difference $n_1$, between the first core and the clad are in a range where the following Expressions $$Y \leq -3.333X + 3.1 \quad (5)$$

$$Y \geq 2.5X - 1.625 \quad (6)$$

$$Y \geq -0.833X + 0.975 \quad (7)$$

$$Y \geq -1.429X + 1.386 \quad (8)$$

$$Y \leq 0.5 \quad (9)$$

$$Y \geq 0.35 \quad (10)$$

are satisfied.

Further, the present invention relates to a plastic optical fiber having a first core, a second core with a different refractive index from the first core, disposed concentrically on the outside of the first core, and a clad disposed concentrically on the outside of the second core, wherein:

a ratio X ($r_1/r_2$) of a first core radius $r_1$ to a second core radius $r_2$ and a ratio Y ($n_2/n_1$) of a refractive index difference $n_2$ between the second core and the clad to a refractive index difference $n_1$ between the first core and the clad are in a range where the following Expressions $$Y \geq -1.429X + 1.429 \quad (11)$$

$$Y \leq -2.5X + 2.4 \quad (12)$$

$$Y \leq 0.5 \quad (13)$$

$$Y \geq 0.4 \quad (14)$$

are satisfied.

Further, the present invention relates to a plastic optical fiber having a first core, a second core with a different refractive index from the first core, disposed concentrically on the outside of the first core, and a clad disposed concentrically on the outside of the second core, wherein:

a ratio X ($r_1/r_2$) of a first core radius $r_1$, to a second core radius $r_2$ and a ratio Y ($n_2/n_1$) of a refractive index difference $n_2$ between the second core and the clad to a refractive index difference $n_2$, between the first core and the clad are in a range where the following Expression $$(X-0.707)^2 + (Y-0.5)^2 \leq 0.0004 \quad (15)$$

is satisfied.

Further, the present invention relates to a plastic optical fiber having a first core, a second core with a different refractive index from the first core, disposed concentrically on the outside of the first core, and a clad disposed concentrically on the outside of the second core, wherein:

a ratio X ($r_1/r_2$) of a first core radius $r_1$, to a second core radius $r_2$ and a ratio Y ($n_2/n_1$) of a refractive index difference $n_2$ between the second core and the clad to a refractive index difference $n_1$, between the first core and the clad are in a range where the following Expression $$(X-0.775)^2 + (Y-0.4)^2 \leq 0.0004 \quad (16)$$

is satisfied.

Further, the present invention relates to any optical fiber as set forth above, wherein:

the first core and the second core are each composed of one kind of polymer;

a compatibly blended layer of a polymer blend which consists of polymers constituting neighboring layers, respectively, is each formed between layers of the first core and the second core and between layers of the second core and the clad; and a thickness of either of said compatibly blended layers is not greater than 10 $\mu$m.

Further, the present invention relates to a plastic optical fiber having a first core, a second core with a different refractive index from the first core, disposed concentrically on the outside of the first core, and a clad disposed concentrically on the outside of the second core, wherein:

a ratio X ($r_1/r_2$) of a first core radius $r_1$ to a second core radius $r_2$ and a ratio Y ($n_2/n_1$) of a refractive index difference $n_2$ between the second core and the clad to a refractive index difference $n_1$ between the first core and the clad are in a range where the following Expressions $$Y \geq -1.134X + 1.0518 \quad (1)$$

$$X \leq -1.4842Y^2 + 1.1097Y + 0.7097 \quad (2)$$

$$Y \leq 0.7 \quad (3)$$

$$X \geq 0.5 \quad (4)$$

are satisfied;

the first core and the second core are each composed one kind of polymer;

a compatibly blended layer of a polymer blend which consists of polymers constituting neighboring layers, respectively, is each formed between layers of the first core and the second core and between layers of the second core and the clad; and a thickness of either of said compatibly blended layers is not greater than 10 μm.

Further, the present invention relates to any plastic optical fiber as set forth above, wherein a compatibly blended layer of a polymer blend which consists of polymers constituting neighboring layers, respectively, is not formed, at least, either between layers of the first core and the second core or between layers of the second core and the clad.

Further, the present invention relates to any plastic optical fiber as set forth above, wherein a −3 dB bandwidth measured at a fiber length of 50 m under the condition of all mode excitation is not less than 400 MHz.

Further, the present invention relates to a plastic optical fiber cable comprising any plastic optical fiber as set forth above, the outer surface of which is coated with a resin.

Further, the present invention relates to an optical transmission device, comprising any plastic optical fiber or plastic cable as set forth above, a light emitting element with an excitation NA of not less than 0.3, disposed at one end thereof, and an optical receiver disposed at the other end thereof.

Further, the present invention relates to an optical transmission device, comprising:

a plastic optical fiber having a first core, a second core with a different refractive index from the first core, disposed concentrically on the outside of the first core, and a clad disposed concentrically on the outside of the second core, wherein: a ratio $X$ ($r_1/r_2$) of a first core radius $r_1$, to a second core radius $r_2$ and a ratio $Y$ ($n_2/n_1$) of a refractive index difference $n_2$ between the second core and the clad to a refractive index difference $n_2$, between the first core and the clad are in a range where the following Expressions $$Y \geq -1.134X + 1.0518 \quad (1)$$

$$X \leq -1.4842Y^2 + 1.1097Y + 0.7097 \quad (2)$$

$$Y \leq 0.7 \quad (3)$$

$$X \geq 0.5 \quad (4)$$

are satisfied, a light emitting element with an excitation NA of not less than 0.3, disposed at one end of the plastic optical fiber; and an optical receiver disposed at the other end of the plastic optical fiber.

According to the present invention, there can be provided a POF with a double-layered core, having a high transmission power and a wide bandwidth. Further, there can be provided an optical transmission device capable to transmit signals at high speed.

BEST MODE FOR CARRYING OUT THE INVENTION

A POF of the present invention has a first core, a second core with a different refractive index from the first core, disposed concentrically on the outside of the first core, and a clad disposed concentrically on the outside of the second core (such a core in structure as having a first core and a second core is referred to as "a double-layered core" hereinafter).

To reduce the scattering loss of the POF, it is preferable that the first core and the second core are each composed of one kind of polymer, and more preferable that, in addition, the clad is also composed of one kind of polymer. On such an occasion, a small amount of a known low molecular compound can be added into the polymer so as to control the refractive index profile without unduly increasing the scattering loss. In the POF of the present invention, between layers of the first core and the second core and between layers of the second core and the clad, there may be each formed a compatibly blended layer of a polymer blend which consists of polymers constituting neighboring layers, respectively. Nevertheless, to reduce the scattering loss of the POF, the thinner the compatibly blended layer is, the better it is. The thickness thereof is preferably not greater than 10 μm, more preferably not greater than 3 μm, and still more preferably not greater than 1 μm. Viewed from the point of scattering loss reduction in the POF, it is particularly preferable if no compatibly blended layer is formed at all.

Figure 1:
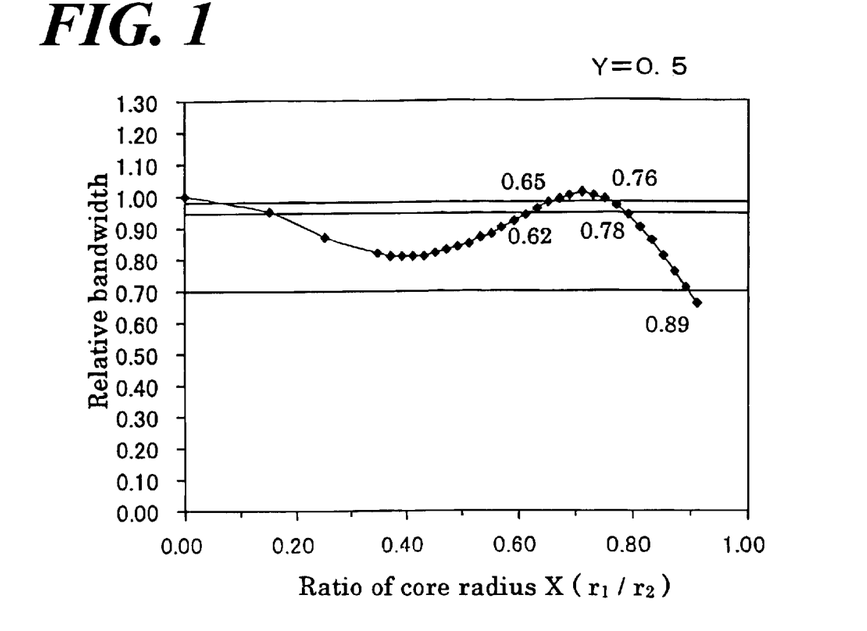
FIG. 1 is a graph showing the relative bandwidth versus the ratio X of core radius for the ratio Y of refractive index difference of 0.5, which is obtained by a simulation.
Figure 2:
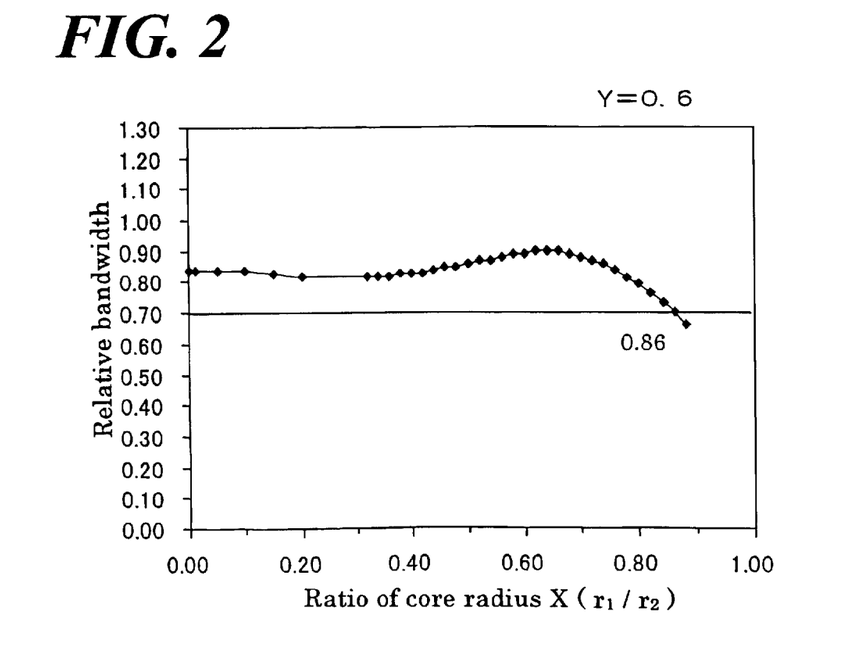
FIG. 2 is a graph showing the relative bandwidth versus the ratio X of core radius for the ratio Y of refractive index difference of 0.6, which is obtained by a simulation.
Figure 3:
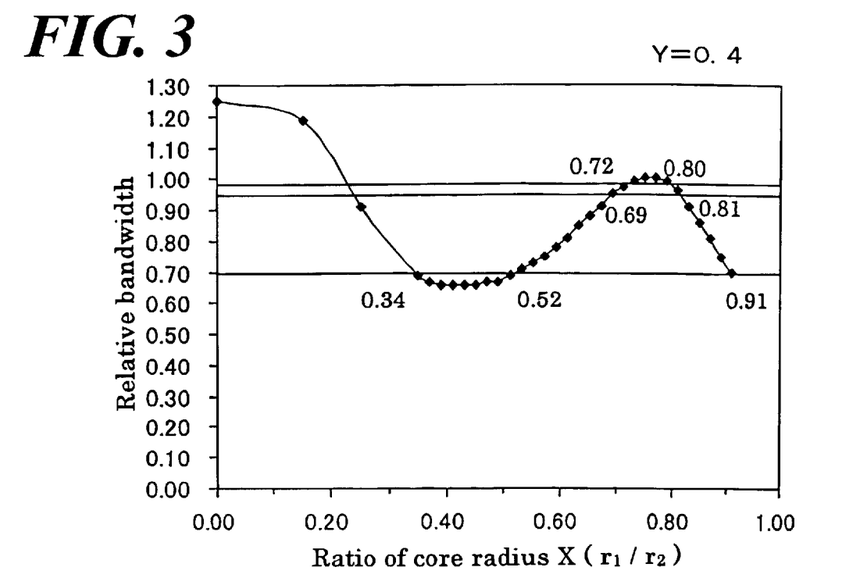
FIG. 3 is a graph showing the relative bandwidth versus the ratio X of core radius for the ratio Y of refractive index difference of 0.4, which is obtained by a simulation.

FIG. 1 to FIG. 3 show the results of simulation for a POF with a double-layered core, representing the dependences of the relative bandwidth on the ratio X of core radius for the ratio Y of each refractive index difference of 0.5, 0.6 and 0.4, in which the value of the bandwidth was each obtained by calculation with the ratio X of core radius and the ratio Y of refractive index difference being varied. This simulation was made for a POF in which no compatibly blended layer is formed either between layers of the first core and the second core or between layers of the second core and the clad. Hereat, the relative bandwidth in FIG. 1 to FIG. 3 is normalized by taking the maximum value of the bandwidth for Y of 0.5 to be 1. For the above simulation, the technique described in "Multimode theory of graded-core fibers", The Bell System Technical Journal, Vol. 52, No. 9, pp. 1563–1578 (1973) by D. Gloge and E. A. J. Marcatili, was employed.

Now, in the case of a digital transmission system designed for a POF with a relative bandwidth of 1, if the relative bandwidth of the POF becomes narrower than 1, distortion of pulses may arise and bring about the interference between adjacent codes. In this transmission system, if acceptable distortion of pulses (change of the rise time) caused by the POF is up to 1.4 times, the relative bandwidth of the POF that is required must be equal to or greater than 1/1.4 (≈0.7). In this case, therefore, relative bandwidth of 0.7 or greater (in other words, in the range where the bandwidth is, at least, 70% of the maximum bandwidth) can be regarded as the preferable bandwidths. As seen in FIG. 1 to FIG. 3, when Y=0.5, the preferable range for X is 0.89 or less; when Y=0.6, the preferable range for X is 0.86 or less; and when Y=0.4, the preferable range for X is a range not greater than 0.34 and a range not less than 0.52 but not greater than 0.91.

Next, from the viewpoint of optical transmission power, the preferable range for the ratio X of core radius and the ratio Y of refractive index difference is described. In an optical transmission device comprising a light source disposed at one end of a POF and an optical receiver disposed at the other end thereof, a light source with a large excitation NA (NA for emission light) is preferably employed so as to increase the quantity of light incident on the POF. The excitation of NA of the light source is preferably 0.3 or greater or more preferably 0.4 or greater. As the light source, any known light source such as a LD (Laser Diode), a LED (Light Emitting Diode) or the like can be used, but an inexpensive, mass-produced LED is preferably used. If the POF has a small cross-sectional area for the inner layer core, hereat, a quantity of light possible to be coupled thereinto becomes small. In consequence, for optical communication, either a transmissible distance becomes shorter or, if a POF with the same length is utilized, accurate recognition of received signals becomes difficult so that the transmissible signal speed in the optical transmission device becomes lowered. Accordingly, in the present invention, the ratio X of core radius is set to be not less than 0.5, and preferably in the range between 0.5 and 0.78 or not less than 0.82. Further, to obtain a still higher transmission power, the ratio X of core radius is set to be preferably not less than 0.76 and more preferably not less than 0.775.

When a POF with a double-layered core is subjected to all mode excitation, the light propagating inside the core contains rays traveling only through the inner layer core and rays going and coming both the outer layer core and the inner layer core. In effect, the rays within the core propagate, reflecting from the interface between the inner layer core and outer layer core and the interface between the outer layer core and the clad. Since the material with relatively insufficient refinement is often utilized as the clad material for the sake of cost and, therefore, the clad material has normally a lower transparency than the core material, the rays making total reflection from the interface between the clad and the core receive greater loss which results from interface mismatch than the rays making total reflection from the interface between the inner layer core and the outer layer core. Accordingly, in order to make more rays travel only through the inner layer core and enhance the transmission power, in a POF of the present invention, the ratio Y of refractive index difference is set to be not greater than 0.7 and preferably in the range not greater than 0.33 or between 0.37 and 0.7. For the purpose of achieving a still higher transmission power, the ratio Y of the refractive index difference is preferably set to be not greater than 0.4 or below 0.4.

The refractive index difference $n_1$ between the first core and the clad is not specifically limited. However, the numerical aperture of the POF is preferably set to be not greater than 0.4 to secure an appropriate bandwidth performance so that the refractive index difference $n_1$ is preferably set to be in the range not greater than 0.056.

Figure 4:
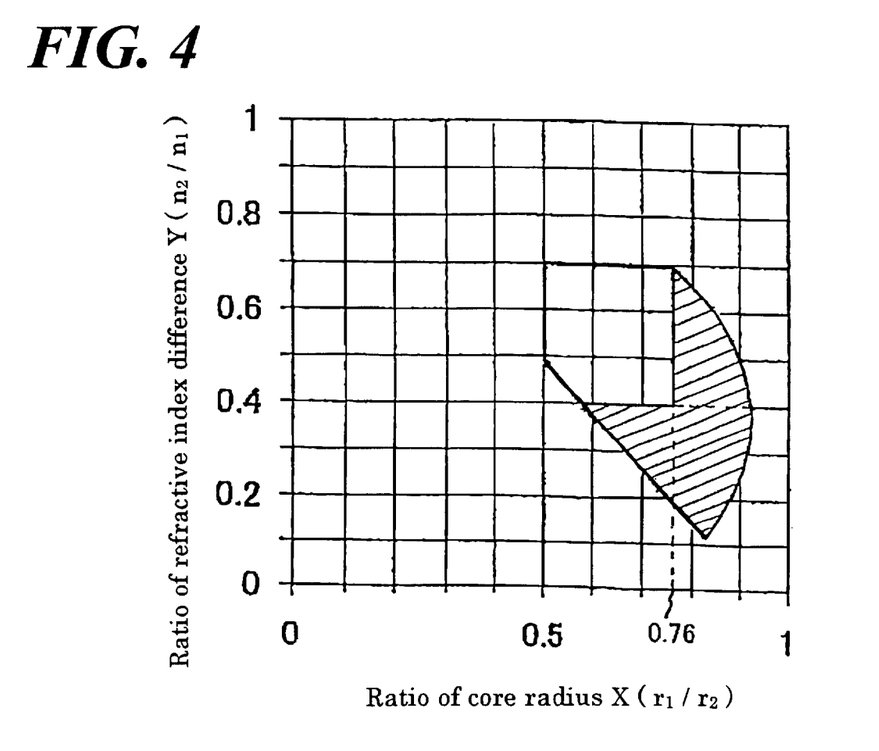
FIG. 4 is a diagram showing a preferable range for the ratio X of core radius and the ratio Y of refractive index difference of the POF.

FIG. 4 shows a preferable range for the ratio X of core radius and the ratio Y of refractive index difference. The range shown in FIG. 4 is a range where the following Expressions (1) to (4) are satisfied (only excepting that X=0.8 and Y=0.35; X=0.8 and Y=0.45 as well as X=0.6 and Y=13/22).

$$Y \geq -1.134X + 1.0518 \quad (1)$$

$$X \leq -1.4842Y^2 + 1.1097Y + 0.7097 \quad (2)$$

$$X \geq 0.5 \quad (3)$$

$$Y \leq 0.7 \quad (4)$$

With the above expressions satisfied, even when applied to an optical transmission device using a light source with an excitation NA as large as 0.3 or more, it is possible to provide a POF with a double-layered core, having a relatively high transmission power and a sufficiently wide bandwidth. In order to obtain a still higher transmission power, X and Y are preferably set to be in a range where Expressions (1) and (2) are satisfied and, at the same time, $X \geq 0.76$ or either $Y \leq 0.4$ or $Y < 0.4$ is satisfied (only excepting that X=0.8 and Y=0.35 as well as X=0.8 and Y=0.45), in other words, in a range of the shadowed region of FIG. 4.

A POF of the present invention is formed in such a way as described above that −3 dB bandwidth thereof at a fiber length of 50 m, measured under the condition of all mode excitation, is 400 MHz or higher. In recent years, an inexpensive LED with a bandwidth of 400 MHz or so has been developed and an inexpensive POF applicable to this LED has been looked for. A POF with a double-layered core of the present invention can demonstrate excellent performance for this very bandwidth.

Although the afore-mentioned POF is well suited for relatively long-haul optical transmission with a fiber length of 50 m or so, it is very often utilized, in practice, within a length of 20 m for in-house optical communication. When the afore-mentioned POF is applied to optical transmission within a length of 20 m, more amply sufficient power can be secured as an optical transmission power than when applied to 50 m length optical transmission.

Figure 6:
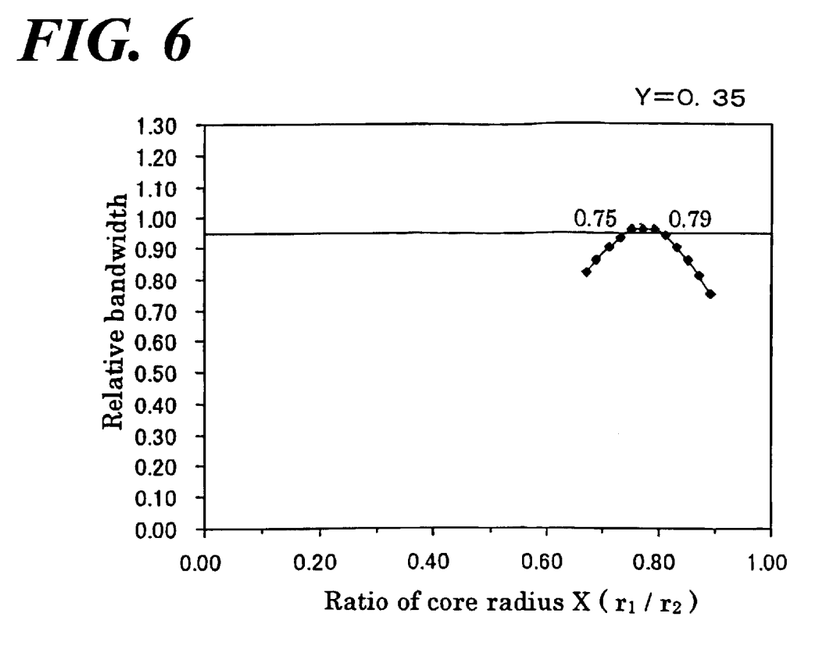
FIG. 6 is a graph showing the relative bandwidth versus the ratio X of core radius for the ratio Y of refractive index difference of 0.35, which is obtained by a simulation.

Further, for the afore-mentioned POF, the preferable range of the bandwidth is set to be a range where the bandwidth is, at least, 70% of the maximum bandwidth, but the more preferable range is a range where the bandwidth is, at least, 95% of the maximum bandwidth. Simulation results shown in FIG. 1, FIG. 3 and FIG. 6 indicate that the range where the bandwidth that is equal to or greater than 95% of the maximum bandwidth can be secured is as follows; that is, when Y=0.5, a range for X is between 0.62 and 0.78; when Y=0.4, a range for X is between 0.69 and 0.81; and when Y=0.35, a range for X is between 0.75 and 0.79, respectively.

Figure 7:
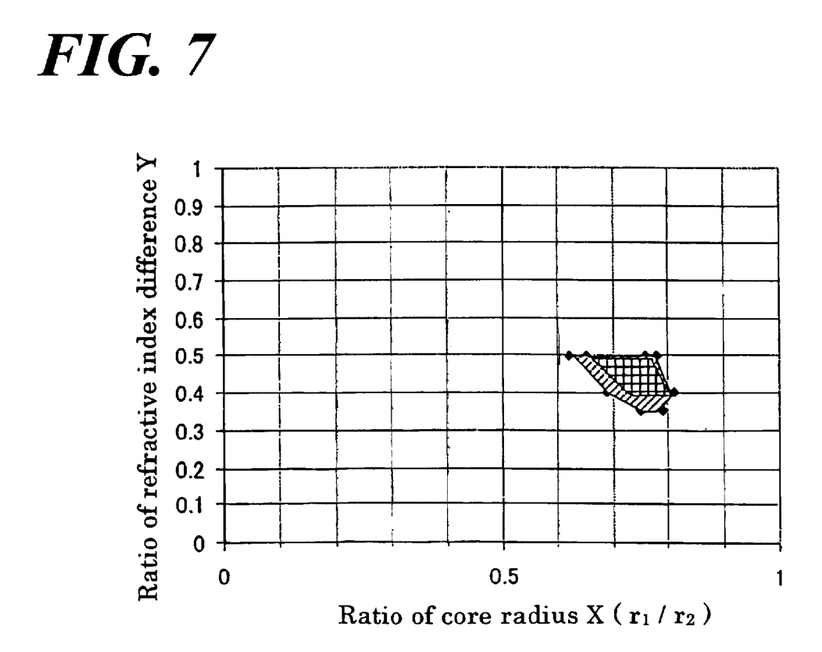
FIG. 7 is a diagram showing a preferable range for the ratio X of core radius and the ratio Y of refractive index difference of the POF.
Figure 8:
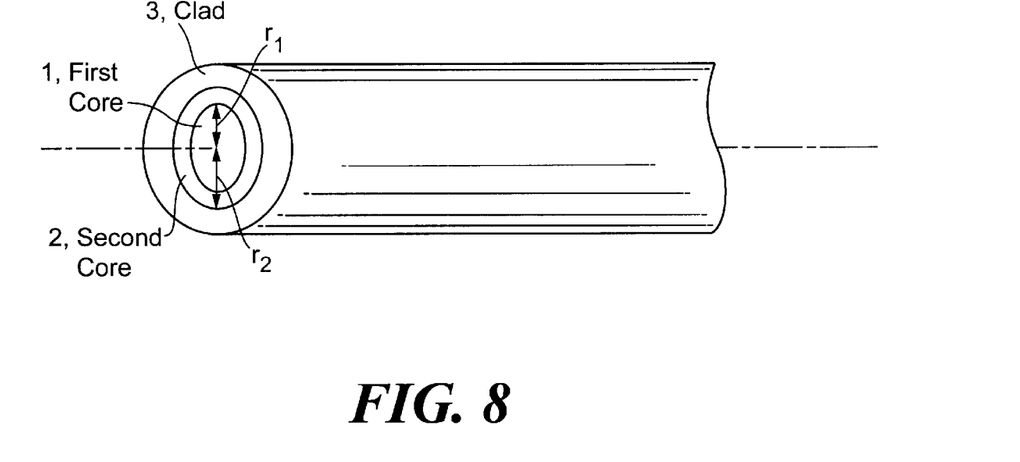
FIG. 8 is a view showing one POF having a first core 1 with radius $r_1$, a second core with radius $r_2$ and a clad 3.

Accordingly, to secure the bandwidth that is at least 95% of the maximum bandwidth, X and Y are preferably set to be within a region where the following Expressions (5) to (10) define (a region defined by the outer borderlines in FIG. 7).

$$Y \leq -3.333X + 3.1 \quad (5)$$

$$Y \geq 2.5X - 1.625 \quad (6)$$

$$Y \geq -0.833X + 0.975 \quad (7)$$

$$Y \geq -1.429X + 1.386 \quad (8)$$

$$Y \leq 0.5 \quad (9)$$

$$Y \geq 0.35 \quad (10)$$

Further, on the basis of simulation results shown in FIG. 1 and FIG. 3, this region includes a range of X between 0.65 and 0.76 for Y=0.5 and a range of X between 0.72 and 0.80 for Y=0.4. Accordingly, to secure the bandwidth that is at least 98% of the maximum bandwidth, X and Y are preferably set to be within a region where the following Expressions (11) to (14) define (a region defined by the inner borderlines in FIG. 7).

$$Y \geq -1.429X+1.429 \quad (11)$$

$$Y \leq -2.5X+2.4 \quad (12)$$

$$Y \leq 0.5 \quad (13)$$

$$Y \geq 0.4 \quad (14)$$

Further, when Y=0.5, the point showing the maximum bandwidth is at X=0.707 so that the bandwidth can be set the highest by setting X and Y in the vicinity of this point.

Accordingly, it is particularly preferable that X and Y are set to be within the range satisfying the following Expression (15).

$$(X-0.707)^2+(Y-0.5)^2 \leq 0.0004 \quad (15)$$

Similarly, when Y=0.4, the point showing the maximum bandwidth is at X=0.775 so that the bandwidth can be set the highest by setting X and Y in the vicinity of this point.

Accordingly, it is particularly preferable that X and Y are set to be within the range satisfying the following Expression (16).

$$(X-0.775)^2+(Y-0.4)^2 \leq 0.0004 \quad (16)$$

Next, materials for the POF with a double-layered core of the present invention are described.

With respect to materials of the first core and the second core which form the double-layered core of the present invention, it is for example, possible to use polymers selected appropriately, according to the refractive index to be aimed, from the group consisting of homopolymers that can be obtained by polymerizing respective uniform monomers mentioned below and copolymers that can be obtained by copolymerizing two or more different kinds of those monomers. Thereat, materials should be selected so as to make the refractive index of the first core higher than that of the second core.

As for monomers being used to yield the core materials of the present invention, vinyl monomers that can be readily made to form large molecules through radical polymerization are preferable, with industrial production considered. The monomers of this sort include methyl methacrylate, benzyl methacrylate, phenyl methacrylate, vinyl benzoate, styrene, 1-phenylethyl methacrylate, 2-phenylethyl methacrylate, diphenylmethyl methacrylate, 1,2-diphenylethyl methacrylate, 1-bromoethyl methacrylate, benzyl acrylate, α,α-dimethylbenzyl methacrylate, 4-fluorostylene, 2-chloroethyl methacrylate, isobornyl methacrylate, adamantyl methacrylate, tricyclodecyl methacrylate, 1-methylcyclohexyl methacrylate, 2-chlorocyclohexyl methacrylate, 1,3-dichloropropyl methacrylate, 2-chloro-1-chloromethylethyl methacrylate, bornyl methacrylate, cyclohexyl methacrylate, allyl methacrylate, tetrahydrofurfuryl methacrylate, vinyl chloroacetate, glycidyl methacrylate, methyl-α-chloroacrylate, 2,2,2-trifluoroethyl methacrylate, 2,2,3,3-tetrafluoropropyl methacrylate, 2,2,3,3,3-pentafluoropropyl methacrylate, 2,2,2-trifluoro-1-trifluoromethylethyl methacrylate, 2,2,3,4,4,4-hexafluorobutyl methacrylate, 2,2,3,3,4,4,5,5-octafluoropentyl methacrylate, 2,2,2-trifluoroethyl-α-fluoroacrylate, 2,2,3,3-tetrafluoropropyl-α-fluoroacrylate, 2,2,3,3,3-pentafluoropropyl-α-fluoroacrylate, 2,2,3,3,4,4,5,5-octafluoropentyl-α-fluoroacrylate, 2,4-difluorostyrene, vinyl acetate, tert-butyl methacrylate, isopropyl methacrylate, hexadecyl methacrylate, isobutyl methacrylate, α-trifluoromethyl acrylate, β-fluoroacrylate, β,β-difluoroacrylate, β-trifluoromethyl acrylate, β,β-bis (trifluoromethyl) acrylate, α-chloroacrylate and so forth.

In particular, homopolymers of methyl methacrylate (abbreviated as PMMA hereinafter) are preferably used for the first core, because they can provide a relatively low-loss POF. Here, for the second core, copolymers of methyl methacrylate and fluorinated alkyl (meta) acrylate may be employed, and especially copolymers of methyl methacrylate and 2,2,3,3-tetrafluoropropyl methacrylate are preferably employed owing to their low-loss characteristic. A relatively low-loss POF can be also obtained when copolymers of benzyl methacrylate and methyl methacrylate are utilized for the first core and PMMA, for the second core.

Regarding the clad materials used in the present invention, known polymers may be employed. For example, copolymers made of two or more different kinds of the above monomers, vinylidene fluoride based copolymers or the like can be utilized. For the clad material, polymers having a refractive index smaller than the one of the second core should be selected.

For a POF with a double-layered core of the present invention, a protective layer may be set around the clad layer. With this protective layer additionally set, mechanical characteristics such as a bending strength of the POF can be improved and protection of the clad material against damage can be provided. As the material of the protective layer, a material with a refractive index lower than the one of the clad layer is preferably used. For example, copolymers obtained by copolymerizing two or more different kinds of monomers selected from the group consisting of vinylidene fluoride, tetrafluoroethylene and hexafluoropropylene may be preferably used. The thickness of the protective layer may be set appropriately, but preferably in the range not less than 10 μm but not greater than 400 μm.

Next, a method of manufacturing a POF of the present invention is described.

A POF of the present invention can be manufactured in the same way as carried out by the ordinal manufacturing method of a POF having a normal concentric multi-layered conjugate structure.

In manufacturing a POF of the present invention, to achieve easy control over the thickness of a compatibly blended layer, a conjugate spinning method is preferably employed. Among conjugate spinning methods, the ram-extrusion conjugate spinning method, the continuous conjugate spinning method or the like can be preferably used.

Figure 5:
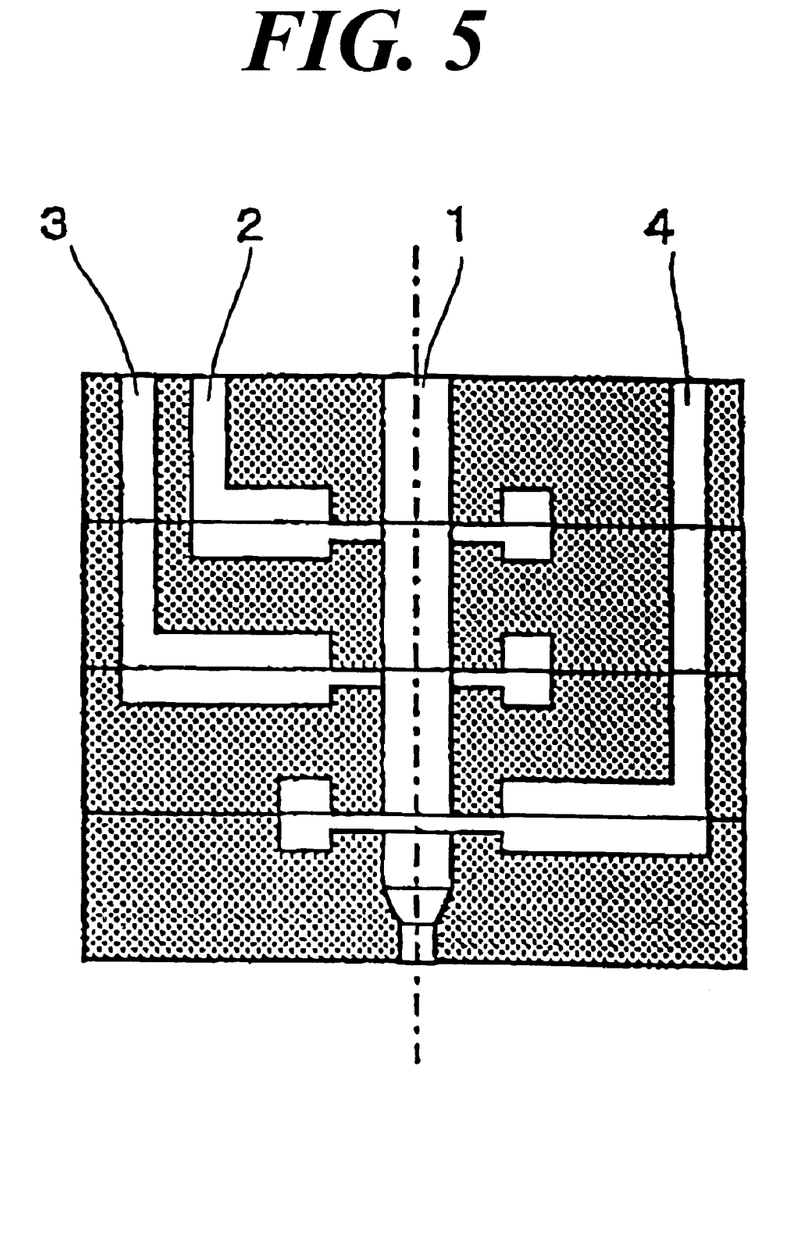
FIG. 5 is a cross-sectional view showing one example of a conjugate spinning nozzle used for fabrication of a plastic optical fiber according to the present invention.

The ram-extrusion conjugate spinning method is a method which comprises steps of forming one rod each for every polymer that is to form a first core, a second core, a clad and, if required, a protective layer; inserting one rod each into any one of cylinders; extruding molten polymer of each rod by thrusting from one end of the cylinder by a piston, while melting the rod at the other end of the cylinder; feeding a polymer at a given amount each to any one of a first core material inlet 1, a second core material inlet 2, a clad material inlet 3 and a protective layer material inlet 4 of a conjugate spinning nozzle with a structure illustrated in FIG. 5; forming a multi-layered structure by forming a layer of each polymer to a prescribed thickness in succession and thereafter discharging a fabricated filament from the nozzle. The discharged filament is cooled while being taken up at a constant speed.

The continuous conjugate spinning method is a method which comprises steps of melting continuously, by an extruder, polymers each of which is to form a layer; carrying out devolatilization if circumstances require and thereafter feeding the polymers each at a given amount to a conjugate spinning nozzle as shown in FIG. 5 in the same way as described above; forming a multi-layered structure by forming a layer of each polymer to a prescribed thickness in succession and thereafter discharging a formed filament from the nozzle. The discharged filament is cooled while being taken up at a constant speed.

When a POF is manufactured by a conjugate spinning method of this sort, through an adjustment of the melting contact time period in the spinning nozzle for each polymer that is to form a layer, the interpenetrating diffusion length of polymers can be regulated and, consequently, the thickness of a compatibly blended layer can be controlled.

In order to improve mechanical characteristics, a once-formed POF is, if necessary, subjected to a thermal drawing treatment either consecutively after spinning or after being wound up completely.

Next, a POF cable of the present invention is described.

A POF cable of the present invention is a thing in which a coating is applied onto the outer surface of a POF that consists of a double-layered core and a clad, obtained as described above, or a POF in which a protective layer is further formed around a clad. A POF cable formed by an application of a coating has gained advantages that handling and distinction of thin POFs become easier, and protection against mechanical damage such as damage caused by external force as well as heat resistance and moisture resistance can be provided and besides the outside light can be prevented from penetrating thereinto.

The thickness of the coating material is appropriately determined, according to the prescribed diameter of the POF and the prescribed outer dimension of the POF cable, but is normally selected within the range not less than 0.2 mm but not greater than 1.5 mm.

In general, as the coating material, a thermoplastic resin including a vinyl chloride resin, a polyamide resin and a polyolefine resin such as polyethylene can be utilized. Further, ethylene/vinyl acetate copolymers, a polymer blend of ethylene/vinyl acetate copolymers and a vinyl chloride resin can be preferably used as the coating material. As the coating materials, these resins are preferable because of their softness and low resistance against bending stress.

Application of a coating material onto the outer surface of the POF can be carried out by a known method of manufacturing a POF cable. For instance, while a POF is passed through a coating die, a molten coating material is applied to coat around that with a prescribed thickness, and thereby a POF cable can be manufactured.

EXAMPLES
(POF with a Ratio of Refractive Index Difference Y=0.5)

For a POF having a double-layered core with a ratio Y of refractive index difference of 0.5, polymethylmethacrylate (PMMA) was used for a first core, and a binary copolymer of 2,2,3,3-tetrafluoropropyl methacrylate (4FM) and methyl methacrylate (MMA) with a weight percentage of 4FM being 20% by weight was used for a second core, and a copolymer of 3,3,4,4,5,5,6,6,7,7,8,8,9,9,10,10-heptadecafluorodecyl methacrylate (17FM)/styrene/methyl methacrylate=33/6/61 (% by weight) was used for a clad, and thereby a POF with a diameter of 750 μm was manufactured. The thickness of the clad, thereat, was set to be 10 μm. The refractive indices of layers were 1.491, 1.476 and 1.461 for the first core, the second core and the clad, respectively. The ratio Y of refractive index difference was, hereat, 0.5. Although the cross-section of this POF was observed under a microscope, any compatibly blended layer was not seen either between layers of the first core and the second core or between layers of the second core and the clad, indicating any substantial compatibly blended layer was not formed.

Fabrication of a POF was carried out by making conjugation of polymers each of which was the material of a layer, through the use of a conjugate spinning nozzle with a structure shown in FIG. 5, so as to form a concentric multi-layered structure wherein each layer has its own prescribed thickness, and thereafter making the filament discharge from the nozzle and cool while being taken up at a constant speed, and subsequently doubling the length by means of drawing at a drawing temperature of 145° C. and then being wound up.

Using this method described herein, several POFs with a ratio Y of refractive index difference of 0.5 and various ratios X of core radius shown in Table 1 were manufactured. The layer thickness of each layer was controlled by regulating the ratio of discharged amount of polymers from the nozzle, the discharge speed, the spinning speed and the drawing ratio. The ratio of core area listed in Table 1 represents the ratio of cross-sectional area of the first core and the second core, and, for example, 30/70 indicates that the ratio of the first core cross-sectional area to the second core cross-sectional area is 30 to 70.

The bandwidths and relative bandwidths for various ratios of core radius are shown in Table 1. The bandwidths in the table represent the bandwidths measured for various fabricated POFs under the condition of all mode excitation, using an optical sampling oscilloscope (detector) manufactured by Hamamatsu Photonics Co., Ltd. and a light source with an emission wavelength of 650 nm. The POFs used in the measurements were 50 m in length. Further, the relative bandwidths are normalized with respect to the bandwidth of a POF having a ratio of core area of 50/50 (the ratio of core radius is 0.707).

TABLE 1

Y = 0.5

| | Ratio of core area | Ratio of core radius X | Bandwidth [MHz] | Relative bandwidth |
|---|---|---|---|---|
| Example 1 | 30/70 | 0.548 | 488 | 0.90 |
| Example 2 | 40/60 | 0.632 | 520 | 0.96 |
| Example 3 | 50/50 | 0.707 | 540 | 1.00 |
| Example 4 | 60/40 | 0.775 | 511 | 0.95 |
| Example 5 | 70/30 | 0.837 | 452 | 0.84 |
| Case 1 for comparison | 80/20 | 0.894 | 371 | 0.69 |
| Case 2 for comparison | 90/10 | 0.949 | 227 | 0.42 |

(POF with a ratio of refractive index difference Y = 0.4)

Except that a binary copolymer of 2,2,3,3-tetrafluoropropyl methacrylate (4FM) and methyl methacrylate (MMA) with a weight percentage of 4FM being 24% by weight was used for a second core, a POF with a ratio Y of refractive index difference of 0.4 was manufactured in the same way as the afore-mentioned POF with a ratio Y of refractive index difference of 0.5. The refractive index of the second core thereof was 1.473.

The results of the measurements of the bandwidths and relative bandwidths for various ratios of core radius are shown in Table 2.

TABLE 2

Y = 0.4

|  | Ratio of core area | Ratio of core radius X | Bandwidth [MHz] | Relative bandwidth |
|---|---|---|---|---|
| Case 3 for comparison | 30/70 | 0.548 | 395 | 0.69 |
| Example 6 | 40/60 | 0.632 | 467 | 0.86 |
| Example 7 | 50/50 | 0.707 | 522 | 0.96 |
| Example 8 | 60/40 | 0.775 | 541 | 1.00 |
| Example 9 | 70/30 | 0.837 | 480 | 0.89 |
| Example 10 | 80/20 | 0.894 | 395 | 0.73 |
| Case 4 for comparison | 90/10 | 0.949 | 308 | 0.57 |

(POF with a ratio of refractive index difference Y = 0.25)

Except that a binary copolymer of 2,2,3,3-tetrafluoropropyl methacrylate (4FM) and methyl methacrylate (MMA) with a weight percentage of 4FM being 30% by weight was used for a second core, a POF with a ratio Y of refractive index difference of 0.25 was manufactured in the same way as the afore-mentioned POF with a ratio Y of refractive index difference of 0.5. The refractive index of the second core thereof was 1.4685.

The results of the measurements of the bandwidths and relative bandwidths for various ratios of core radius are shown in Table 3.

TABLE 3

Y = 0.25

|  | Ratio of core area | Ratio of core radius X | Bandwidth [MHz] | Relative bandwidth |
|---|---|---|---|---|
| Example 11 | 50/50 | 0.707 | 389 | 0.72 |
| Example 12 | 60/40 | 0.775 | 432 | 0.80 |
| Example 13 | 70/30 | 0.837 | 430 | 0.80 |
| Example 14 | 80/20 | 0.894 | 388 | 0.72 |

The above results confirm the POFs of the present invention can provide wide transmission bandwidths.

(Evaluation of Optical Transmission Power (Relative Emission Power))

Next, a light sent forth from a LED with a numerical aperture of 0.6 was coupled into the afore-mentioned fabricated POFs, 50 m in length, and the quantities of emission light thereat were measured.

When an emission power of a reference POF manufactured separately was taken to be 1, the quantities of emission light obtained were expressed as relative emission powers, and a comparison of these quantities was made.

As the reference POF, a SI-type POF having a single-layered core was employed. For the core material of this reference POF, the inner layer core material (PMMA) described above was utilized and for the clad material, a clad material similar to the clad material of above POF with a well double-layered core was utilized. As the above POF with a double-layered core, the outer diameter and the clad thickness of the POF were set to be 750 μm and 10 μm, respectively.

The results of the measurements of the relative emission power for various fabricated POFs are shown in Table 4.

Table 4 shows, in the cases that Y is 0.4 or less, the emission powers thereof can be kept, at least, 75% of the emission power of the reference POF. Further when the ratio X of core radius is 0.775 or higher, the emission power can also maintain high level.

Further, even if POFs have wide bandwidths, they may have low emission powers, as Table 4 shows clearly in the cases of POFs whose ratios Y of refractive index reference are 0.5 and ratios X of core radius are 0.548 and 0.632, respectively, the relative emission powers are as small as 0.69 or less.

TABLE 4

|  |  | Relative emission power | | |
|---|---|---|---|---|
| Ratio of core area | Ratio of core radius X | Ratio of refractive index difference Y = 0.5 | Ratio of refractive index difference Y = 0.4 | Ratio of refractive index difference Y = 0.25 |
| 30/70 | 0.548 | 0.64 | — | — |
| 40/60 | 0.632 | 0.69 | 0.75 | — |
| 50/50 | 0.707 | 0.75 | 0.79 | 0.87 |
| 60/40 | 0.775 | 0.80 | 0.84 | 0.90 |
| 70/30 | 0.837 | 0.85 | 0.88 | 0.92 |
| 80/20 | 0.894 | 0.90 | 0.92 | 0.95 |
| 90/10 | 0.949 | 0.95 | — | — |

(Presence of a Compatibly Blended Layer and Transmission Bandwidth)

Comparison was made between bandwidths of a POF manufactured by the same rotational polymerization method as described in Japanese Patent Application Laid-open No. 160956/1998 and a POF manufactured by the continuous conjugate spinning method. In both cases of those POFs with double-layered core fabricated hereat, the outer diameter and the clad thickness were set to be 750 μm and 10 μm, respectively, and X=0.837 and Y=0.7. While, in the POF manufactured by the rotational polymerization method, a compatibly blended layer with a thickness of 21 μm was observed, under a microscope, in the vicinity of the interface between the first core and the second core, in the POF manufactured by the continuous conjugate spinning method, no compatibly blended layer was observed.

The transmission bandwidths and relative emission powers for these were measured under the same conditions as described above. The bandwidth and the relative emission power for the POF manufactured by the rotational polymerization method were 210 MHz and 0.71, respectively. As against these, the bandwidth and relative emission power for the POF manufactured by the continuous conjugate spinning method were 480 MHz and 0.89, respectively.

This shows that even if X and Y are each set to be one and the same value, a POF in which no compatibly blended layer is formed can obtain transmission bandwidth and transmission power of better quality.

(Evaluation of POF Cable)

Further, using a crosshead type coating apparatus, polyethylene melted at a temperature of 150° C. was applied onto the external surface of the above POF to provide a coating and thereby a POF cable with an outside diameter of 2.2 mm was obtained. The POF cable obtained by making use of a POF of the present invention similarly demonstrated to have a wide bandwidth and a high emission power.

(Evaluation of Optical Transmission Device)

A POF cable obtained as described above was cut at 50 m. Using a LED with an emission wavelength of 650 nm as a light source, this light source with an excitation NA of 0.3 was disposed at one end of the POF cable and a photodiode was disposed as an optical receiver at the other end, and then signals of 400 MHz were transmitted. A POF cable of the present invention successfully proved its excellent capability in signal transmission.

What is claimed is:

1. A plastic optical fiber having a first core, a second core with a different refractive index from the first core, disposed concentrically on the outside of the first core, and a clad disposed concentrically on the outside of the second core, wherein:

a ratio X ($r_1/r_2$) of a first core radius $r_1$ to a second core radius $r_2$ and a ratio Y ($n_2/n_1$) of a refractive index difference $n_2$ between the second core and the clad to a refactive index difference $n_1$ between the first core and the clad are in a range satisfying (a) the following expressions:

$$Y \geq -1.134X+1.0518 \qquad (1)$$

$$X \leq -1.4842Y^2+1.1097Y+0.7097 \qquad (2)$$

$$Y<0.4, \text{ or} $$

(b) the following expressions:

$$Y \geq -1.134X+1.0518 \qquad (1)$$

$$X \leq -1.4842Y^2+1.1097Y+0.7097 \qquad (2)$$

$$X \geq 0.76, \text{ and} \qquad (3)$$

provided that coordinate pairs X=0.8 and Y=0.35 and X=0.8 and Y=0.45 are excepted.

2. A plastic optical fiber having a first core, a second core with a different refractive index from the first core, disposed concentrically on the outside of the first core, and a clad disposed concentrically on the outside of the second core, wherein:

a ratio X ($r_1/r_2$) of a first core radius $r_1$ to a second core radius $r_2$ and a ratio Y ($n_2/n_1$) of a refractive index difference $n_2$ between the second core and the clad to a refactive index difference $n_1$ between the first core and the clad are in a range that satisfies the following expressions:

$$Y \geq -1.134X+1.0518 \qquad (1)$$

$$X \leq -1.4842Y^2+1.1097Y+0.7097 \qquad (2)$$

$$Y \leq 0.7, \text{ and} \qquad (3)$$

$$X \geq 0.5 \qquad (4)$$

provided that coordinate pairs of X=0.8 and Y=0.35; X=0.8 and Y=0.45; and X=0.6 and Y=13/22 are excepted.

3. A plastic optical fiber having a first core, a second core with a different refractive index from the first core, disposed concentrically on the outside of the first core, and a clad disposed concentrically on the outside of the second core, wherein:

a ratio X ($r_1/r_2$) of a first core radius $r_1$ to a second core radius $r_2$ and a ratio Y ($n_2/n_1$) of a refractive index difference $n_2$ between the second core and the clad to a refactive index difference $n_1$ between the first core and the clad are in a range where the following Expressions $$Y \leq -3.333X+3.1 \qquad (5)$$

$$Y \geq 2.5X - 1.625 \qquad (6)$$

$$Y \geq -0.833X+0.975 \qquad (7)$$

$$Y \geq -1.429X+1.386 \qquad (8)$$

$$Y \leq 0.5 \qquad (9)$$

$$Y \geq 0.35 \qquad (10)$$

are satisfied.

4. A plastic optical fiber having a first core, a second core with a different refractive index from the first core, disposed concentrically on the outside of the first core, and a clad disposed concentrically on the outside of the second core, wherein:

a ratio X ($r_1/r_2$) of a first core radius $r_1$ to a second core radius $r_2$ and a ratio Y ($n_2/n_1$) of a refractive index difference $n_2$ between the second core and the clad to a refactive index difference $n_1$ between the first core and the clad are in a range where the following Expressions $$Y \geq -1.429X+1.429 \qquad (11)$$

$$Y \leq -2.5X+2.4 \qquad (12)$$

$$Y \leq 0.5 \qquad (13)$$

$$Y \geq 0.4 \qquad (14)$$

are satisfied.

5. A plastic optical fiber having a first core, a second core with a different refractive index from the first core, disposed concentrically on the outside of the first core, and a clad disposed concentrically on the outside of the second core, wherein:

a ratio X ($r_1/r_2$) of a first core radius $r_1$ to a second core radius $r_2$ and a ratio Y ($n_2/n_1$) of a refractive index difference $n_2$ between the second core and the clad to a refactive index difference $n_1$ between the first core and the clad are in a range where the following Expression $$(X-0.707)^2+(Y-0.5)^2 \leq 0.0004 \qquad (15)$$

is satisfied.

6. A plastic optical fiber having a first core, a second core with a different refractive index from the first core, disposed concentrically on the outside of the first core, and a clad disposed concentrically on the outside of the second core, wherein:

a ratio X ($r_1/r_2$) of a first core radius $r_1$ to a second core radius $r_2$ and a ratio Y (n2/$n_1$) of a refractive index difference $n_2$ between the second core and the clad to a refactive index difference $n_1$ between the first core and the clad are in a range where the following Expression $$(X-0.775)^2+(Y-0.4)^2 \leq 0.0004 \qquad (16)$$

is satisfied.

7. The plastic optical fiber according to any one of claims 1 to 6, wherein:

the first core and the second core are each composed of one kind of polymer;

a compatibly blended layer of a polymer blend which consists of polymers constituting neighboring layers, respectively, is each formed between layers of the first core and the second core and between layers of the second core and the clad; and a thickness of either of said compatibly blended layers is not greater than 10 μm.

8. A optical transmission device comprising the plastic optical fiber or a plastic cable according to any one of claims 1 to 6, a lighting emitting element with an excitation numerical aperture (NA) of not less than 0.3, disposed at one end thereof, and an optical receiver disposed at the other end thereof.

9. The plastic optical fiber according to claim 7, wherein a thickness of either of said compatibly blended layers is not greater than 1 μm.

10. The plastic optical fiber according to claim 7, wherein a compatibly blended layer of a polymer blend which consists of polymers constituting neighboring layers, respectively, is not formed, at least, either between layers of the first core and the second core or between layers of the second core and the clad.

11. The plastic optical fiber according to claim 7, wherein a −3 dB bandwidth measured at a fiber length of 50 m under the condition of all mode excitation is not less than 400 Mhz.

12. A plastic optical fiber cable comprising a plastic optical fiber according to claim 7, wherein said plastic optical fiber has an outer surface which is coated with a resin.

13. An optical transmission device, comprising the plastic optical fiber or a plastic cable according to claim 7, a light emitting element with an excitation NA of not less than 0.3, disposed at one end thereof, and on optical receiver disposed at the other end thereof.

14. An optical transmission device comprising the plastic optical fiber or a plastic cable according to claim 9, a light emitting element with an excitation numerical aperture (NA) of not less than 0.3, disposed at one end thereof, and an optical receiver disposed at the other end thereof.

15. An optical transmission device comprising the plastic optical fiber or a plastic cable according to claim 10, a light emitting element with an excitation numerical aperture (NA) of not less than 0.3, disposed at one end thereof, and an optical receiver disposed at the other end thereof.

16. An optical transmission device, comprising the plastic optical fiber or a plastic cable according to claim 11, a light emitting element with an excitation NA of not less than 0.3, disposed at one end thereof, and an optical receiver disposed at the other end thereof.

17. An optical transmission device comprising the plastic optical fiber or a plastic cable according to claim 12, a light emitting element with an excitation numerical aperture (NA) of not less than 0.3, disposed at one end thereof, and an optical receiver disposed at the other end thereof.

18. A plastic optical fiber having a first core, a second core with a different refractive index from the first core, disposed concentrically on the outside of the first core, and a clad disposed concentrically on the outside of the second core, wherein:

a ratio X ($r_1/r_2$) of a first core radius $r_1$ to a second core radius $r_2$ and a ratio Y ($n_2/n_1$) of a refractive index difference $n_2$ between the second core and the clad to a refractive index difference $n_1$ between the first core and the clad are in a range that satisfies the following expressions $$Y \geq -1.134X + 1.0518 \quad (1)$$

$$X \leq -1.4842Y^2 + 1.1097Y + 0.7097 \quad (2)$$

$$Y \leq 0.7 \quad (3)$$

$$X \geq 0.5 \quad (4);$$

the first core and the second core are each composed of one kind of polymer;

a compatibly blended layer of a polymer blend which consists of polymers constituting neighboring layers, respectively, is each formed between layers of the first core and the second core and between layers of the second core and the clad; and a thickness of either of said compatibly blended layers is not greater than 10 μm.

19. The plastic optical fiber according to claim 18, wherein a thickness of either of said compatibly blended layers is not greater than 1 μm.

20. The plastic optical fiber according to claim 18, wherein a compatibly blended layer of a polymer blend which consists of polymers constituting neighboring layers, respectively, is not formed, at least, either between layers of the first core and the second core or between layers of the second core and the clad.

21. The plastic optical fiber according to claim 18, wherein a −3 dB bandwidth measured at a fiber length of 50 m under the condition of all mode excitation is not less than 400 MHz.

22. A plastic optical fiber cable comprising a plastic optical fiber according to claim 18, wherein said plastic optical fiber has an outer surface which is coated with a resin.

23. An optical transmission device comprising the plastic optical fiber or a plastic cable according to claim 19, 20, 21 or 22, a light emitting element with an excitation numerical aperture (NA) of not less than 0.3, disposed at one end thereof, and an optical receiver disposed at the other end thereof.

24. An optical transmission device, comprising:

a plastic optical fiber having a first core, a second core with a different refractive index from the first core, disposed concentrically on the outside of the first core, and a clad disposed concentrically on the outside of the second core, wherein a ratio X ($r_1/r_2$) of a first core radius $r_1$ to a second core radius $r_2$ and a ratio Y ($n_2/n_1$) of a refractive index difference $n_2$ between the second core and the clad to a refractive index difference $n_1$ between the first core and the clad are in a range satisfying the following expressions $$Y \geq -1.134X + 1.0518 \quad (1)$$

$$X \leq -1.4842Y^2 + 1.1097Y + 0.7097 \quad (2)$$

$$Y \leq 0.7 \quad (3)$$

$$X \geq 0.5 \quad (4);$$

a light emitting element with an excitation numerical aperture (NA) of not less than 0.3, disposed at one end of the plastic optical fiber; and an optical receiver disposed at the other end of the plastic optical fiber.

* * * * *